June 15, 1937.  R. DONLEY, SR  2,083,596
CELLULAR HEAT INSULATION PIPE COVERING
Filed Dec. 7, 1935  2 Sheets-Sheet 1
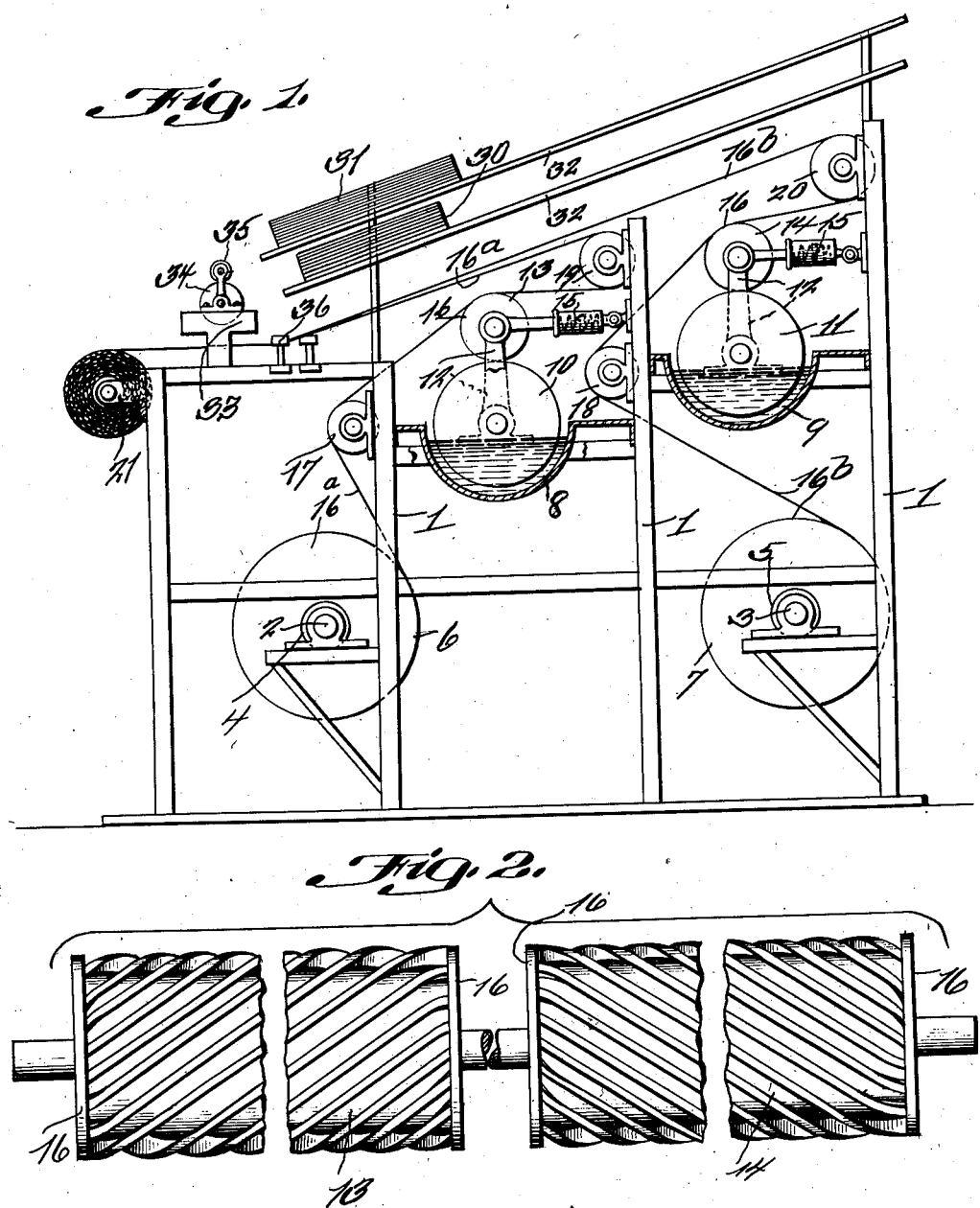
INVENTOR.
Raymond Donley Sr.
BY
ATTORNEY.

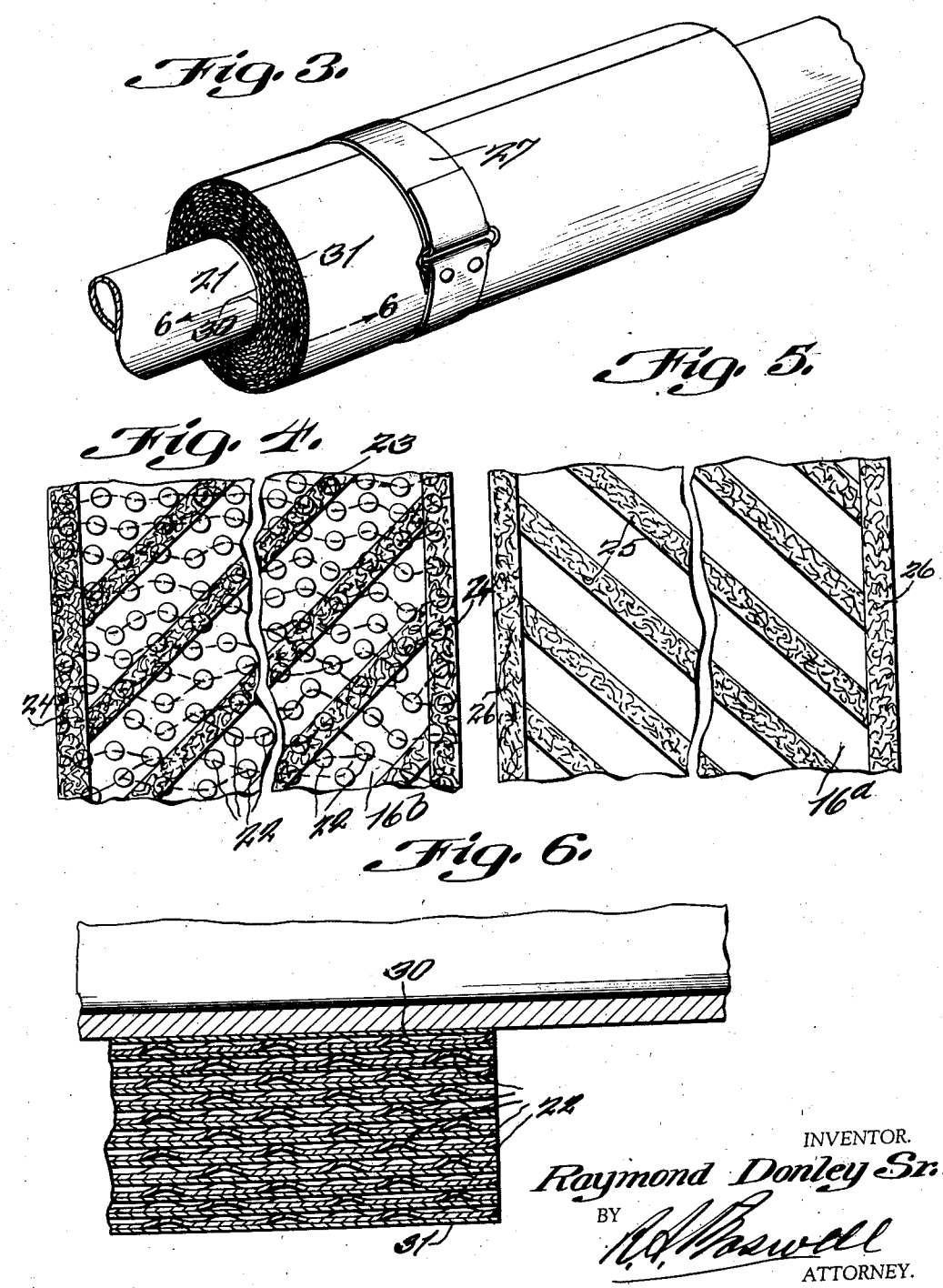

Patented June 15, 1937

2,083,596

UNITED STATES PATENT OFFICE 2,083,596

CELLULAR HEAT INSULATION PIPE COVERING

Raymond Donley, Sr., Plymouth Meeting, Pa.

Application December 7, 1935, Serial No. 53,412

3 Claims. (Cl. 154—45)

This invention relates to heat insulation pipe covering of cellular construction, the cells running on substantially 45 degree angles circumferentially around the covering and acting to contain air and to insure substantial and the best of insulation against the loss of heat from various pipes.

Heretofore the silicate applying rollers have had their ribs arranged in circular formation concentric with the roller, and the indentures in the asbestos paper extending longitudinally thereof, whereas in the present invention the silicate applying means on the rollers are on substantially 45 degree angles in reverse directions circumferentially of the rollers, and the indentures are arranged in an undulated formation in the asbestos paper, thereby avoiding any communication between the cells of the heat insulation cellular pipe covering.

In the present invention it is the aim in the manufacture of this improved cellular pipe covering to fabricate or roll and fasten together plain and indented asbestos sheets, and in view of the fact that the silicate applying rolls have their silicate applying means extending around the rolls on opposite angles with the indentures in one of the asbestos sheets in undulated formation any air communication between the diamond shape cells of the covering is prevented.

Another purpose of the invention is derived from the fact that by applying the silicate to the plain and indented asbestos paper in opposite 45 degree angles, the plain and indented sheets are held together more securely and separation thereof is prevented, particularly when cutting the pipe covering when fitting same to pipes. In the old construction of pipe coverings where the silicate is applied circularly concentric with the covering, the cells being in similar arrangement the sheets of asbestos may easily separate or come apart when the covering is cut for application to a pipe, which is very detrimental and undesirable in heat insulation pipe coverings of this character, and which is entirely prevented by the present improved construction.

Still another purpose of the invention is to provide a construction of machine wherein plain and indented strips are fed from separate rolls thereof simultaneously over silicate applying rolls, the strips traveling at the same rate of speed and adhered together as fed upon a mandrel, for the purpose of forming tubular cellular heat insulating pipe coverings, which may be removed from the mandrel in one body or cut therefrom. In case of cutting therefrom the coverings may be applied to pipes for heat insulation, whereas if removed from the mandrel in one body it will be necessary to cut the pipe covering in order to apply to pipes acting as heat insulations.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view inside elevation of a conventional type of machine for rolling cellular insulating pipe coverings.

Figure 2 discloses a pair of silicate applying rolls bracketed, the ribs for picking up the silicate and applying it to the strips of asbestos paper extending on 45 degree angles in opposite directions to apply the silicate to the strips in likewise formation.

Figure 3 is a perspective view of a section of the improved cellular pipe covering constructed in accordance with the invention.

Figure 4 is a plan view of a section of the indented strip with the indentures arranged in an undulated formation and the silicate applied thereto on a 45 degree angle.

Figure 5 is a plan view of a section of the plain or smooth asbestos strip with the silicate applied on a 45 degree angle in the opposite direction to that shown in Figure 4.

Figure 6 is an enlarged section on line 6—6 of Figure 3 through the roll of pipe covering.

Referring to the drawings 1 identifies the frame on a conventional type of machine for rolling this improved cellular heat insulating pipe covering on a mandrel, and mounted in bearings of the frame are spindles or shafts 2 and 3 constituting elements of rollers 4 and 5 on which is rolled plain and indented asbestos paper 6 and 7.

Also supported on the frame are troughs 8 and 9 for containing silicate, and in bearings of the frame are silicate feeding rolls 10 and 11. The silicate in these troughs is a solution for causing adherence between the plain and indented strips of asbestos or other similar paper.

Mounted in bearings of yieldably supported arms 12 are the spindles of silicate applying rolls 13 and 14, the supporting arms 12 being pivoted and yieldably mounted at 15. These silicate applying rolls have their cylindrical surfaces provided with raised ribs which are disposed on substantially 45 degree angles, the angle of the ribs on the roll 14 being just the opposite to the angle of the ribs on the roll 13, and adjacent the ends of these rolls 13 and 14 there are raised circular ribs 16, so that when the plain and indented lengths of asbestos paper 16a and 16b pass over these rolls silicate is applied to the paper, said silicate 16d on the plain paper being on a 45 degree angle just the opposite to the silicate 23 on the indented paper, and silicate 24 is also applied adjacent the opposite edges of the paper longitudinally thereof.

As will be noted the plain and indented paper passes over idle rolls 17 and 18 then over the silicate applying rolls 13 and 14, and then over idle rolls 19 and 20, the paper traveling longitudinally of the frame of the machine and coming together and adhering as its winds on a mandrel 21 at one end of the frame of the machine, thereby forming an asbestos cellular heat insulating roll, which when removed from the mandrel 21 can be cut and applied to a pipe for heat insulating purposes.

As shown in Figure 4 the strip of asbestos constituting one of the plys of the material to form the cellular pipe covering is provided with indentures 22 arranged in an undulated formation, the heavy dark lines on a 45 degree angle across the paper constituting the silicate 23 while the dark lines near the longitudinal opposite edges constitute additional silicate 24, which lines are applied to the paper by the silicate applying roll 14.

As shown in Figure 5 the heavy dark lines arranged on a 45 degree angle just the opposite to those shown in Figure 4 constitute the silicate 25 and the heavy dark lines adjacent the longitudinal opposite margins of the paper constitute silicate 26, so that when these strips of paper come together in passing around the mandrel 21 the silicate on both strips cause an adherence between the strips, and together with the indentures form air cells in the material, there being no communication between the cells, and owing to the opposite 45 degree angles of the silicate lines 23 and 25 the cells are of diamond shape contour. This cellular insulating pipe rolled covering is in the form of a tubular body, which is composed of opposed asbestos lengths of material, which lengths are wound together. It is to be noted the corresponding remote faces of said lengths have silicate adhering heavy lines, and the silicate heavy lines on a face of one of said lengths act to adhere the opposed lengths together prior to passing on a rolled covering supported upon a mandrel. Obviously the adhering heavy lines on a face of the other length of material acting to adhere the adhered lengths on the rolled covering. Furthermore, the adhering heavy lines are disposed on opposite 45-degree angles crossing each other as previously stated and thereby causing diamond-shaped air cells to be formed, which air cells are formed in staggered relation. Said diamond-shaped air cells are closed by the projected areas of said heavy lines of silicate.

In applying a roll of cellular heat insulating material to pipes it is necessary to cut the roll longitudinally and apply the two halves to the opposite sides of the pipe, the two halves being fastened by metal bands 27 as identified in Figure 3.

Prior to the plain and indented asbestos paper passing about the mandrel wound thereon, the papers adhering together one of the sheets of liners 30 is first wound on the mandrel with its ends fastened together. Then the adhering asbestos strips are wound over the liner, and when the covering is completely wound another liner 31 is wound on the complete covering, thereby holding the covering together. These liners are mounted upon supports 32. A container 33 for silicate is supported on the frame of the machine, there being a silicate pick up roll 34 in bearings of the container, there being a second roll 35 to retain the liners in contact with the pick up roll to apply silicate to the under-surface of the liners, to make them adhere to the covering. The adhering asbestos strips pass through a guide 36 and under the container 33 so as to wind on the mandrel.

The invention having been set forth, what is claimed is:

1. A cellular insulating pipe covering, comprising a tubular body composed of opposed alternate plane and indented sheets of asbestos spirally wound together, the respective sheets bearing heavy lines of adhesive, said lines of adhesive being disposed along substantially parallel lines lying at 45-degree angles, the adhesive lines of the alternate sheets being oppositely disposed and in crossing relationship to each other, thereby causing diamond-shaped projected areas to be formed in staggered relationship between the alternate sheets.

2. A cellular insulating pipe covering, comprising a tubular body composed of opposed alternate plane and indented sheets of asbestos spirally wound together, the respective sheets bearing heavy lines of adhesive, said lines of adhesive being disposed along substantially parallel lines lying at 45-degree angles, the adhesive lines of the alternate sheets being oppositely disposed and in crossing relationship to each other, thereby causing diamond-shaped projected areas to be formed in staggered relationship between the alternate sheets, the respective sheets bearing on their corresponding remote faces adjacent their longitudinal edges heavy lines of adhesive, which adhere and close the edge portions of the sheets together, the inner face of one of said sheets having indentures arranged in undulated contour over the surface.

3. A cellular insulating pipe covering, comprising a tubular body composed of opposed alternate plane and indented sheets of asbestos spirally wound together, the respective sheets bearing heavy lines of adhesive, said lines of adhesive being disposed along substantially parallel lines lying at 45-degree angles, the adhesive lines of the alternate sheets being oppositely disposed and in crossing relationship to each other, thereby causing diamond-shaped projected areas to be formed in staggered relationship between the alternate sheets, the respective sheets bearing on their corresponding remote faces adjacent their longitudinal edges heavy lines of adhesive, which adhere and close the edge portions of the sheets together, the inner face of one of said sheets having indentures arranged in undulated contour over the surface, the majority of said indentures being between the 45-degree angle heavy lines, certain other of said indentures being located entirely or partly in said 45-degree angle heavy lines, as well as in the heavy lines adjacent the longitudinal edges, the wall of said tubular body being severed at diametrically opposite points and longitudinally thereof, whereby the covering may fit on a pipe, and means for securing the body on the pipe.

RAYMOND DONLEY, Sr.